United States Patent Office 2,965,679
Patented Dec. 20, 1960

2,965,679

PROCESS FOR THE PRODUCTION OF GLYCEROL AND GLYCOLS FROM SUGAR ALCOHOLS

Fritz Conradin, Tamins, Graubunden, Giuseppe Bertossa, Domat-Ems, Graubunden, and Johann Giesen, Haldenstein, near Chur, Graubunden, Switzerland, assignors to Inventa, A.G. für Forschung und Patentverwertung, Zurich, Switzerland No Drawing. Filed Nov. 12, 1958, Ser. No. 773,154

Claims priority, application Switzerland Nov. 16, 1957

6 Claims. (Cl. 260—635)

The present invention relates to the production of glycerol and glycols from sugar alcohols at h:gh pressures and elevated temperatures and to hitherto not attained yields.

The production of glycerol and glycols by splitting and catalytical hydrogenation of sugar alcohols is known. The known processes are carried out at temperatures up to approximately 300° C. and at pressures not exceeding 300 atmospheres. The usual hydrogenation catalysts, especially nickel precipitated on a carrier, are employed. It also has been proposed to carry out the reaction in weakly acid, neutral or alkaline aqueous solutions.

The known processes have the disadvantages that the yields of glycerol—the most valuable reaction product— are low and that substantial quantities of sugar alcohols are lost by non-controllable side reactions such as decomposition, secondary condensation and resinification.

It furthermore is known that, upon cleavage of sorbitol at approximately 200° C. in a methanol solution and using copper precipitated on kieselguhr as catalyst, the glycerol yield increases with the hydrogen pressure although beyond a pressure of 180 atmospheres no further improvement of the yield will occcr.

It now has been found that higher yields of glycerol can be attained than heretofore known by carrying out methods known per se for the splitting and hydrogenation of sugar alcohols, but at considerably higher pressures than customary.

The object of the present invention is a process for the production of glycerol and glycols by splitting and catalytic hydrogenation of sugar alcohols in aqueous alkaline solutions, employing temperatures of 200–300° C., hydrogen pressures ranging from 500 to 1,000 atmospheres, and pH values of 8–10.

As a catalyst advantageously nickel is used which is precipitated on, e.g., pumice or kieselguhr. Other known hydrogenation catalysts may also be employed. The pH value of the reaction mixture is adjusted simply by the addition of calcium hydroxide.

The theory of splitting and catalytic hydrogenation of sugar alcohols has not been fully explained to date. It has now been found that, according to the present invention, the speed of reaction decreases to a slight extent with increasing pressures. The conversion likewise decreases. This, however, is compensated for by the improved yield of glycerol and the greatly diminished loss of sugar alcohols through side reactions upon an increase in the pressure.

It also has been found that an increase in pressure diminishes the decomposition of glycerol and the occurrence of secondary reactions and that these effects are almost fully overcome at pressures above approximately 600 atmospheres. Furthermore, it has been established that at high pressures the pH value of the reaction mixture remains more constant and also higher. When an initial pH value of, say, 11 is selected, the latter decreases rapidly and then remains fairly constant. At a pressure of 100 atmospheres the pH value of the reaction is approximately 8, but at pressures of 600–800 atmospheres it is approximately 8.8 to 9, which denotes that fewer acids form. It is known that splitting of sugar alcohols in an alkaline phase takes place in a better and less complicated manner. The efficiency of the catalyst also decreases more slowly at high pressures.

The reaction temperature may be chosen as approximately 200–300° C., and preferably between 220 and 250° C. The speed of reaction increases with the temperature, so that a decrease in the speed of reaction, brought on by higher pressures, may be compensated for through a rise in temperature.

If reaction temperatures exceeding 250° C. are employed, it is difficult to introduce the required amount of heat into the reaction vessel. In that case, part of the hydrogen can be burned with oxygen which is pressed into the reactor, and the necessary heat is thereby generated in situ. Depending upon the temperature desired, up to 15 percent of the total hydrogen may thus be burned. This embodiment of the process according to the present invention is particularly advantageous when the process is to be carried out continuously at a temperature of approximately 270° C. The introduction of oxygen has the further advantage that the catalyst resinifies less and remains active for a longer period of time.

The process according to the present invention also is applicable to the hydrogenation and splitting of wood sugar alcohols. These are obtained by the hydrogenation of wood sugars which in turn are derived from the hydrolysis of wood with mineral acids.

The invention now will be further explained by means of the following examples. However, it should be understood that these are given merely by way of illustration, not of limitation, and that many changes may be made in the details without departing from the spirit of the present invention.

Examples

In an autoclave of 5 liter capacity, 1.1 kg. sorbitol and 2.4 l. (liter) water are mixed with enough calcium oxide that the solution has a pH value of approximately 11. 250 g. catalyst are finely divided in the mixture by mechanical agitation. The catalyst consists of kieselguhr containing approximately 20–30 percent metallic nickel.

Hydrogen is introduced into the autoclave under pressure, and heating to the desired reaction temperature is commenced. Within approximately 3 to 5 hours, temperature and pressure are held at the values given in Table 1 below. During the reaction the pH value of the mixture is approximately 8.5–9, depending upon the pressure applied.

After cooling and release of the pressure, the autoclave is emptied, the reaction mixture is filtered and is separated into its individual components in a known manner, e.g., by distillation.

The columns in Table 1 show, in the order stated, the pressures (in atmospheres), the temperatures (in degrees centigrade), the percentage of residue in the filtered, anhydrous reaction mixture (consisting predominantly of sorbitol with a little erythritol and capable of being split again with fresh sorbitol), the yield in percent calculated on the sorbitol used, the percentages glycerol and glycol obtained, respectively, calculated on the yield, and (in the last column) the loss in percent, also calculated on the yield.

The first horizontal line of Table 1 shows the values obtained at 100 atmospheres. These are given merely as comparison of this relatively low pressure to the results obtained at high pressures according to the present invention. Attention also is invited to the fact that unreacted sorbitol, according to the present invention, may be separated in a simple known manner and returned to the hydrogenation.

TABLE 1

| Pressure, Atm. | Temp., °C. | Residue, Percent | Yield, Percent | Glycerol, Percent | Glycols, Percent | Loss, Percent |
|---|---|---|---|---|---|---|
| 100 | 220 | 3.7 | 96.3 | 19.5 | 36.0 | 44.6 |
| 600 | 220 | 47.6 | 52.4 | 45.4 | 43.0 | 11.5 |
| 800 | 220 | 64.5 | 35.5 | 57.0 | 38.2 | 4.8 |

What we claim is:

1. A process for the production of glycerol and glycols by catalytic hydrogenation and splitting of sugar alcohols at elevated temperatures and elevated pressures in aqueous alkaline solution, which comprises hydrogenating and splitting of said alcohols at temperatures ranging from 200 to 300° C. and at hydrogen pressures of 500 to 1,000 atmospheres in a solution having a pH value of 8 to 10.

2. The process according to claim 1, wherein hydrogenation and splitting are carried out in a continuous process at approximately 270° C. and wherein the required heat of reaction is furnished by burning up to 15 percent of the hydrogen introduced for hydrogenation with oxygen which is entered under pressure.

3. The process according claim 1, wherein nickel on a carrier is used as a catalyst.

4. The process according claim 1, wherein nickel precipitated on diatomateous earth as catalyst is used.

5. The process according claim 1, wherein sorbitol is hydrogenated and split.

6. The process according claim 1, wherein wood sugar alcohols are hydrogenated and split.

References Cited in the file of this patent
UNITED STATES PATENTS 2,004,135     Rothrock  --------------  June 11, 1935